United States Patent [19]

Nakajima et al.

[11] Patent Number: 4,811,187

[45] Date of Patent: Mar. 7, 1989

[54] DC-DC CONVERTER WITH SATURABLE REACTOR RESET CIRCUIT

[75] Inventors: Shin Nakajima; Kiyotaka Yamauchi; Osamu Shimoe, all of Saitama, Japan

[73] Assignee: Hitachi Metals Ltd., Japan

[21] Appl. No.: 111,098

[22] Filed: Oct. 20, 1987

Related U.S. Application Data

[63] Continuation of Ser. No. 828,175, Feb. 11, 1986, abandoned.

[30] Foreign Application Priority Data

Feb. 12, 1985 [JP] Japan ............................. 60-24898
Jun. 20, 1985 [JP] Japan ............................ 60-135203

[51] Int. Cl.$^4$ ............................................ H02M 3/335
[52] U.S. Cl. ........................................ 363/25; 363/75; 363/82; 363/91
[58] Field of Search .......................... 363/17-26, 363/75, 82, 90-93, 97, 98, 131, 133, 134

[56] References Cited

U.S. PATENT DOCUMENTS

| | | | | |
|---|---|---|---|---|
| 3,217,239 | 11/1965 | Lunney | ............................. | 363/91 X |
| 3,348,130 | 10/1967 | Jensen | ............................. | 363/25 X |
| 4,217,632 | 8/1980 | Bardos et al. | ....................... | 363/91 X |
| 4,356,438 | 10/1982 | Iwasaki | ............................. | 363/91 X |
| 4,451,876 | 5/1984 | Ogata | ............................. | 363/91 X |
| 4,460,955 | 7/1984 | Hattori et al. | ......................... | 363/91 |

FOREIGN PATENT DOCUMENTS 0023024 3/1978 Japan ..................................... 363/91

OTHER PUBLICATIONS

Report of the Institute of Electric Engineers of Japan Magnetic Research Group, MAG-84-24 28, Jan. 28, 1984, The Institute of Electric Engineers of Japan.

Primary Examiner—Peter S. Wong
Attorney, Agent, or Firm—Finnegan, Henderson, Farabow, Garrett & Dunner

[57] ABSTRACT

A DC-DC converter having a transformer having a primary winding and a secondary winding; means for supplying DC input voltage to the primary winding; at least one switching element connected between the DC input voltage supplying means and the primary winding; rectifying means; at least one saturable reactor having a first winding and a second winding, the first winding being connected between one end of the secondary winding which is positive while the switching element is in a turn-on state and the rectifying means; and reset control circuit means connected to the second winding of the saturable reactor for supplying reset voltage thereto in response to output voltage of the rectifying means. The first and second windings have such polarities that the reset voltage can reset the saturable reactor during a turn-off period of the switching element. This DC-DC converter enjoys less temperature rise in the saturable reactor and a lower level of noise generation.

3 Claims, 12 Drawing Sheets

LOW-FREQUENCY RADIATION NOISE

NOISE TERMINAL VOLTAGE

DC-DC CONVERTER WITH SATURABLE REACTOR RESET CIRCUIT

This application is a continuation of application Ser. No. 828,175, filed Feb. 11, 1986, now abandoned.

BACKGROUND OF THE INVENTION

The present invention relates to a DC-DC converter and more particularly, to a DC-DC converter controlled by a magnetic amplifier consisting essentially of a saturable reactor.

A magnetic amplifier-controlled, stabilized power supply comprising a saturable reactor has already been known. Since this type of power supply converts DC input voltage to stabilized DC output voltage, it is called a DC-DC converter. Of such power supplies, what is now widely used is a so-called Ramey-type, DC-DC converter which is of a forward-type having one switching element. One typical example of this Ramey-type DC-DC converter is shown in FIG. 1. This switching regulator (DC-DC converter) comprises a DC power supply 1 for supplying DC voltage to be stabilized, a transformer 2 having a primary winding 21 connected to the DC power supply 1 and a secondary winding 22, a transistor 3 whose collector is connected to the primary winding 21 and whose emitter is to the DC power supply 1. A self-oscillating circuit 4 in parallel with the DC power supply is connected to the base of the transistor 3 to turn on the transistor 3 on a periodical basis. Connected to the secondary winding 22 is a saturable reactor 5 to which an anode of a rectifying diode 6 is in turn connected. A cathode of the diode 6 is then connected to a choke coil 8 which leads to one output terminal 12. Another rectifying diode 7 is connected between the other end of the secondary winding 22 and the choke coil 8. A capacitor 9 is provided between output terminals 12, 13. The capacitor 9 and the choke coil 8 form a smoothing circuit, namely, an L-C filter. Terminals 12 and 13 are a positive output terminal and a negative output terminal, respectively. The other end of the secondary winding 22 of the transformer 2 is connected to the negative output terminal 13.

An emitter of a transistor 10 for controlling the resetting of the saturable reactor 5 is connected to the positive output terminal 12, and a collector thereof is connected to a point between the saturable reactor 5 and the anode of the diode 6. A base of the transistor 10 is connected to a reset control circuit 11. The reset control circuit 11 receives output voltage which is compared with reference voltage to produce an error signal. The error signal is applied to the base of the transistor 10 to turn on and off the transistor 10 so that proper reset current ir is supplied to the saturable reactor 5 for purpose of controlling the output voltage Vo. In this example, the output voltage Vo is used as a power source for reset current ir.

The operation of the above-mentioned switching regulator will be described. When the transistor 3 is turned on, voltage $V_1$ is applied to the primary winding 21 of the transformer 2, and voltage $V_2$ is induced in the secondary winding 22 which is positive at the dotted end thereof. It is to be noted that the saturable reactor 5 shows a high impedance until it is saturated. Because the saturable reactor 5 can be oppositely magnetized in advance, a period during which it shows a high impedance can be controlled. As a result, voltage is blocked thereby, with voltage $V_M$, almost as high as $V_2$, appearing between both ends of the winding of the saturable reactor 5.

After the saturation of the saturable reactor 5, the voltage $V_M$ decreases almost to zero, permitting the induced current to flow. As a result, voltage $V_2'$ appears between the anode and cathode of the diode 7. This is shown in FIG. 2.

When the transistor 3 is turned off, voltage of an opposite polarity is induced in the secondary winding 22. This voltage is usually called "flyback voltage." The flyback voltage will disappear during the OFF state of the transistor 3. To return the magnetization of the saturable reactor 5 to a desired original level, namely, to "reset" the saturable reactor 5, reset current ir is caused to flow through the saturable reactor 5 along the broken line shown in FIG. 1 by turning on the transistor 10. It is to be noted that the reset current ir flows through the secondary winding 22. In view of the direction of the reset current passing through the secondary winding 22, the transformer 2 retains a magnetic flux density which is higher than a residual magnetic flux density Br. This phenomenon is called "racheting" or "asymmetrical magnetization." The racheting reduces an operable range of the transformer 2, which means that the transformer 2 is easily saturated. This in turn may lead to the destruction of the switching transistor 3.

An article entitled "Saturation Phenomenon of Primary Transformer of Magnetic Control-Type Switching Regulator and Measures against It," Onda et al., Papers of Technical Meeting on Magnetics MAG-84-24, Jan. 28, 1984 discloses a magnetic control-type switching regulator whose circuit is shown in FIG. 3. It is to be noted that this switching regulator, also often called a DC-DC converter, has essentially the same structure as that of FIG. 1, except that in the switching regulator of FIG. 3, a saturable reactor 5 is connected to a negative end of a secondary winding 22, and a path for reset current ir is formed along a transistor 10, a diode 15 and a saturable reactor 5 and back to a negative output terminal 13. Incidentally, the negative end of the secondary winding 22 means that such end of the secondary winding 22 is negative while the transistor 3 is in a turn-on state. As for other elements, the same reference numerals are assigned in FIGS. 1 and 3.

It is clear that while the transistor 3 is in a turn-off state, the reset current ir does not flow through the secondary winding 22. Thus, the racheting of the transformer 2 can be avoided. Nevertheless, this switching regulator has a problem that the saturable reactor 5 undergoes extraordinary temperature rise during the operation. The cause of such extraordinary temperature rise is that resonance current is generated during the turn-off period of the transistor 3 by junction capacitance of the switching transistor 3, capacitance in a snubber circuit connected in parallel to the transistor 3 for absorbing surge voltage which appears at the time of turning off the transistor 3, and inductance of the primary winding 21 of the transformer 2, and that it is applied to the saturable reactor 5 through magnetic coupling of the primary and secondary windings 21 and 22.

This phenomenon will be explained in detail by means of FIG. 4 which is an equivalent circuit to FIG. 3. It is to be noted that the transformer 2 is expressed by an exciting inductance Lex and two leakage inductances $Ln_1$ and $Ln_2$, and that a capacitor 50 is inserted in parallel with the switching transistor 3. The capacitor 50 represents part of a snubber circuit. During the turn-off period of the transistor 3, discharge current id, which may be called "resonance current," flows from the capacitor 50, inducing voltage $V_L$ in the exciting inductance Lex. The relation between the discharge current id and the induced voltage $V_L$ is schematically shown in FIG. 5. The discharge current id begins flowing when the transformer 2 has been reset, namely when the transformer's core has returned to an original state in which it has a residual magnetic flux density Br. As is clearly shown in FIG. 5, while the discharge current id is decreasing, the induced voltage $V_L$ is positive and increasing. This voltage $V_L$ is applied to the saturable reactor 5. A positive part of the voltage $V_L$ is shown by a hatched portion in FIG. 2. Since this resonance current causes the magnetization of the saturable reactor 5, it contributes to the temperature rise of the saturable reactor 5.

The above-mentioned article entitled "Saturation Phenomenon of Primary Transformer of Magnetic Control-Type Switching Regulator and Measures against It" also discloses a magnetic control-type switching regulator equipped with a saturable reactor 5 having first and second windings, which is shown in FIG. 6. An essential feature of this switching regulator is that a saturable reactor 5 has two windings; a first winding 52 connected to an end of a secondary winding 22 which is negative while a switching transistor 3 is in a turn-on state, and a second winding 53 connected between a transistor 10 connected to a positive side of a capacitor 9 and a diode 15 which is in turn connected to a negative output terminal 13. Reference Numeral 51 denotes a magnetic core of the saturable reactor. In this switching regulator, too, reset current ir flows along the broken line shown in FIG. 6, without passing through the secondary winding 22 of the transformer 2.

FIG. 7 shows an equivalent circuit to FIG. 6. It is to be noted that since the first and second windings 52 and 53 of the saturable reactor 5, respectively, are magnetically coupled with each other, the reset current ir flowing through the second winding 53 induces current iM in the first winding 52. Since these two windings 52 and 53 have the same polarity, namely their positive polarity ends are on the same side, the current iM flows through Lex in the same direction as the discharge current id. Therefore, while the discharge current id is decreasing, the current iM substantially offsets the decrease in the discharge current id, leading to minimal voltage $V_L$. If the saturable reactor 5 has such a turn ratio that the induced current iM may sufficiently offset the decrease in the discharge current id, the transformer 2 would generate substantially no voltage despite the discharge current. This is schematically shown in FIG. 8. Because of this feature, the saturable reactor 5 is free from extraordinary heating.

Despite the above advantages, the switching regulator of FIG. 6 still has a problem, which is detrimental to switching regulators as means for supplying stabilized DC voltage. The problem is that it generates noises which are not always sufficiently low. Particularly in view of the recent trend that regulations, such as those of U.S. Federal Communication Committee (FCC) and Verband Deutscher Elektrotechniker (VDE) are becoming stricter on switching regulation's noises, reducing a noise level as low as possible is extremely desired.

OBJECT AND SUMMARY OF THE INVENTION

An object of the present invention is, therefore, to provide a DC-DC converter for providing DC output voltage stabilized by magnetic control using a saturable reactor, which suffers only from a greatly reduced level of noises.

The inventors have found, through extensive research, that noises can be greatly reduced by connecting a saturable reactor having two windings to an end of a secondary winding of a transformer which is positive while a switching transistor for a primary winding of the transformer is in a turn-on state. The present invention is based on this finding.

That is the DC-DC converter according to the present invention comprises a transformer comprising a primary winding and at least one secondary winding; means for supplying DC voltage to the primary winding; at least one switching element connected in series between the DC voltage supplying means and the primary winding; rectifying means; at least one saturable reactor comprising a first winding and a second winding, the first winding being connected between one end of the secondary winding which is positive while the switching element is in a turn-on state and the rectifying means; and reset control circuit means connected to the second winding of the saturable reactor for supplying reset current thereto in response to output voltage of the rectifying means. The first and second windings have such polarities that the reset current can reset the saturable reactor.

DESCRIPTION OF THE PREFERRED EMBODIMENTS

Figure 9:
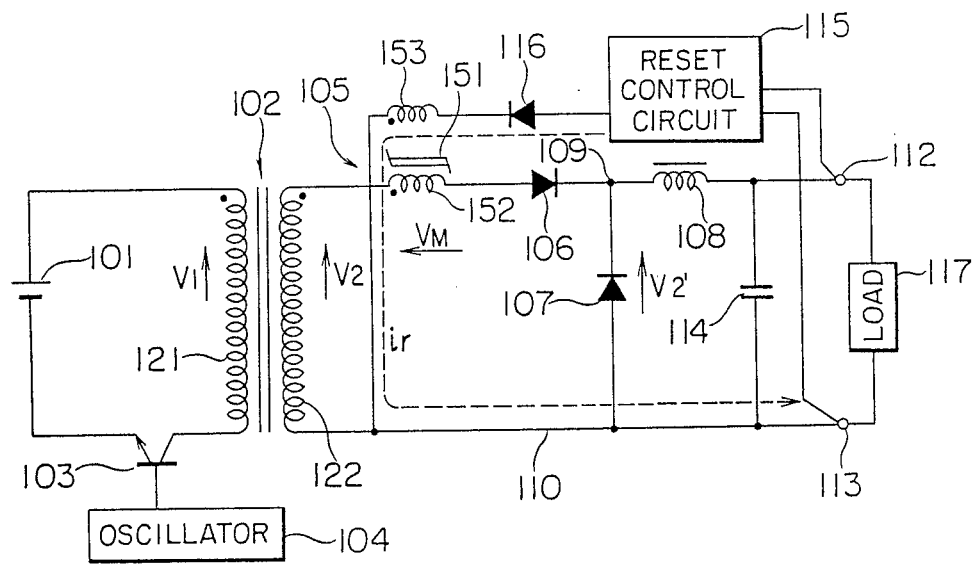
FIG. 9 is a schematic view showing a circuit of a DC-DC converter according to one embodiment of the present invention.

FIG. 9 shows a DC-DC converter according to one embodiment of the present invention. The DC-DC converter has a DC power supply 101 and a transformer 102 which has a primary winding 121 and a secondary winding 122. The DC power supply 101 is connected to the primary winding 121. A switching transistor 103 is interposed between the DC power supply 101 and the primary winding 121 in such a manner that its collector is connected to the primary winding 121 and its emitter is to the DC power supply. The base of the transistor 103 is connected to an oscillator 104.

Connected to the secondary winding 122 is a saturable reactor 105 having a magnetic core 151, a first winding 152 and a second winding 152. Specifically, the first winding 152, which may be called "gate winding," is connected to one end of the secondary winding 122, which is positive while the switching transistor 103 is in a turn-on state, and the second winding 153, which may be called "control winding," is connected to the other end of the secondary winding 122, which is negative while the switching transistor 103 is in a turn-on state. The other end of the first winding 152 is connected to an anode of a diode 106, and a cathode of the diode 106 is in turn connected to a choke coil 108. A diode 107 is interposed between a point 109 between the diode 106 and the choke coil 108 and a line 110 connecting the secondary winding 122 and one output terminal 113. The other output terminal 112 is connected to the choke coil 108. Connected between the output terminals 112 and 113 is a capacitor 114 which forms, together with the choke coil 108, an L-C filter for smoothing output voltage.

A reset control circuit 115 is connected to the second winding 153 via a diode 116. The diode 116 is directed so as to cause reset current ir to flow along the broken line as shown in FIG. 9. A load 117 may be connected between the output terminals 112 and 113.

Figure 2:
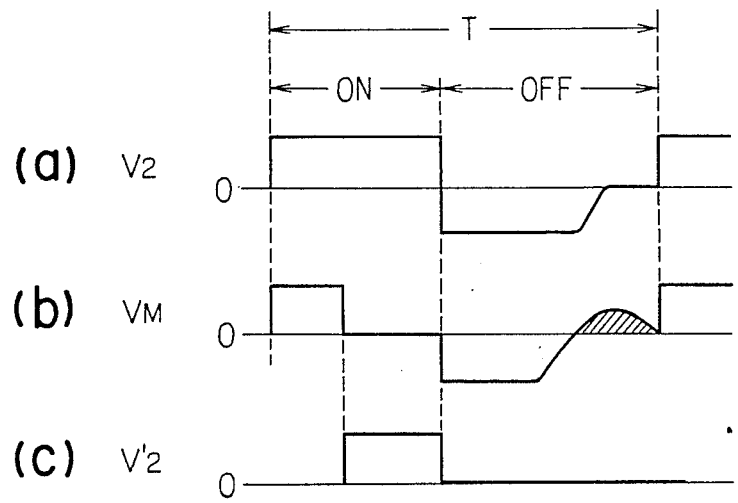
FIG. 2 is a time chart of voltages at a secondary winding of a transformer, a saturable reactor and a rectifying diode.
Figure 3:
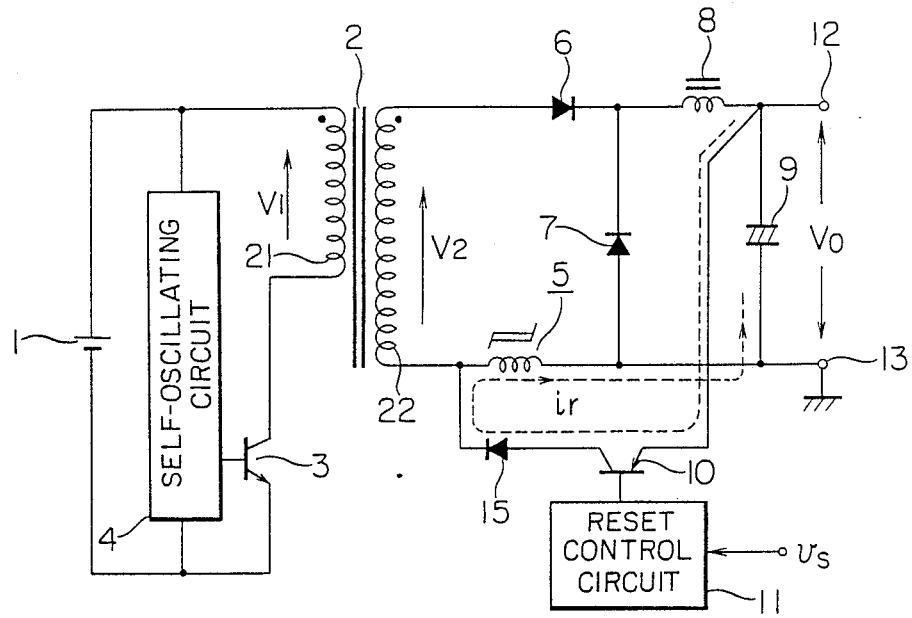
FIG. 3 is a schematic view showing a circuit of another conventional DC-DC converter.
Figure 4:
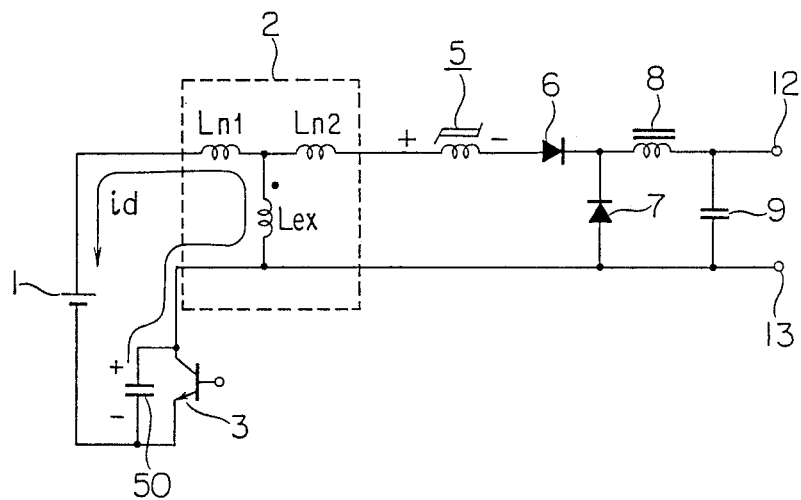
FIG. 4 is a schematic view showing an equivalent circuit to FIG. 3.
Figure 5:
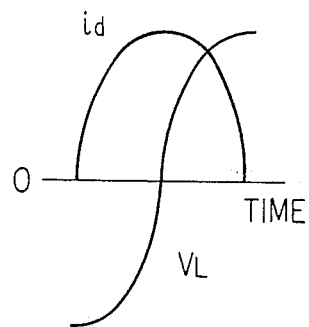
FIG. 5 is a schematic view showing the relation between discharge current and current induced by an exciting inductance in the circuit of FIG. 4.

The operation will be explained below. When the switching transistor 103 is turned on, voltage $V_1$ is applied to the primary winding 121 of the transformer 102, inducing voltage $V_2$ in the secondary winding 122. Voltages at the secondary winding 122, the saturable reactor 105 and the diode 107, shown by symbols $V_2$, $V_M$ and $V_2'$, respectively, undergo essentially the same variations as shown in the time chart of FIG. 2, during the turn-on period of the switching transistor 103. The voltage $V_2'$ is then smoothed by an L-C filter composed of the choke coil 108 and the capacitor 114, and a smoothed output voltage appears between the output terminals 112 and 113.

Figure 6:
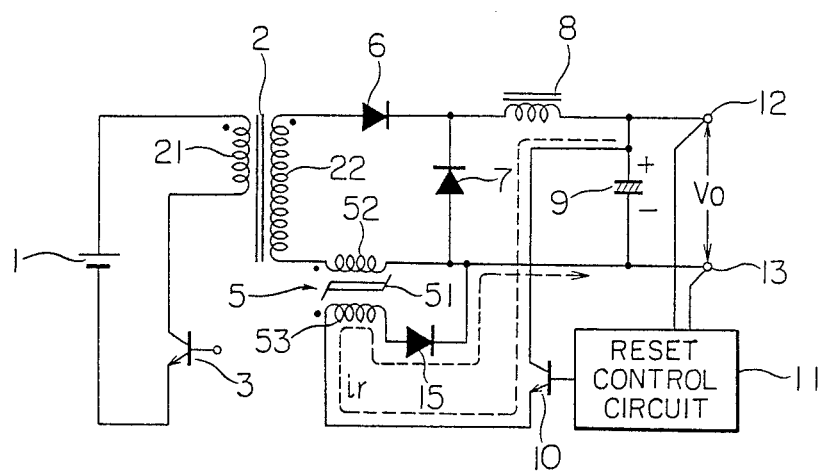
FIG. 6 is a schematic view showing a circuit of a still other, conventional DC-DC converter.
Figure 7:
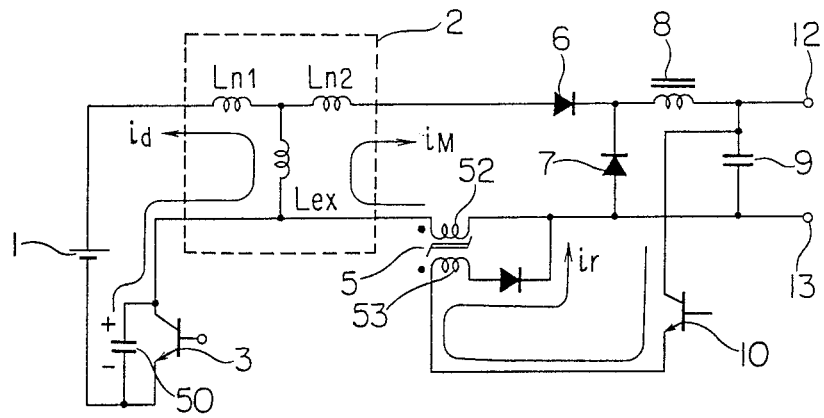
FIG. 7 is a schematic view showing an equivalent circuit to FIG. 6.
Figure 8:
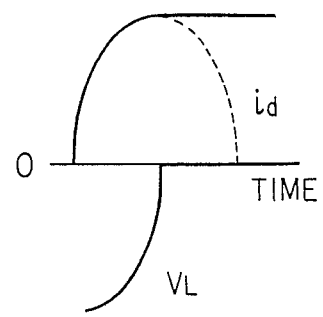
FIG. 8 is a schematic view showing the relation between discharge current and voltage induced by an exciting inductance in the circuit of FIG. 7.
Figure 10:
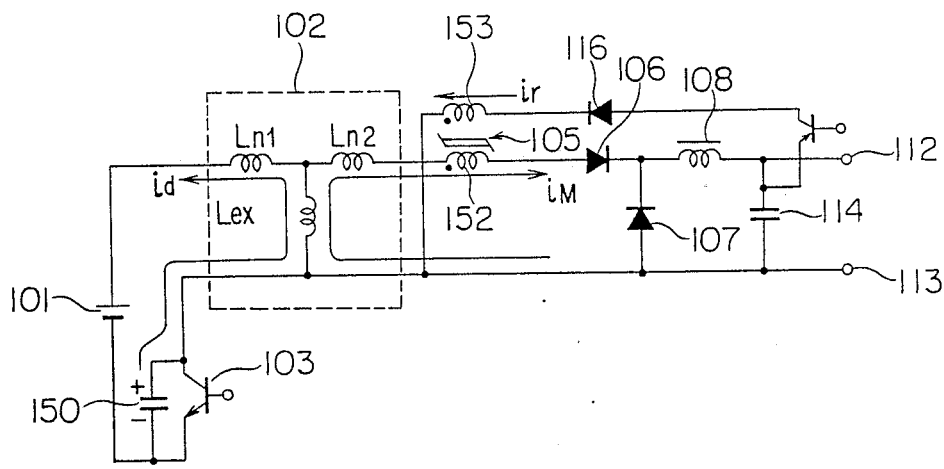
FIG. 10 is a schematic view showing an equivalent circuit to FIG. 9.

It is to be noted that during the turn-off period, the same resetting operation is carried out as in FIG. 6. That is, reset current ir does not flow through the secondary winding 122 so that the racheting of the transformer 102 can be avoided. And as is shown in FIG. 10 which is an equivalent circuit to FIG. 9, current iM induced by the reset current ir through magnetic coupling between the first and second windings 152 and 153 substantially offsets the decrease in the discharge current id so that voltage due to the resonance current is not substantially applied to the saturable reactor 105, avoiding the extraordinary temperature rise of the saturable reactor 105.

Incidentally, where a power source for the reset current ir is the capacitor 114, the reset current does not have enough voltage. This problem can be easily solved by choosing an appropriate turn ratio of the two windings 152, 153 of the saturable reactor 105. That is, voltage applied to the saturable reactor 105 by the controlling winding 153 is $V_O \times n_{M1}/n_{M2}$, wherein $V_O$ is output voltage, and $n_{M1}$ and $n_{M2}$ are the numbers of turns of the first and second windings 152, 153, respectively. Thus, it is clear that enough voltage can be applied to the saturable reactor 105 to reset it by selecting that $n_{M1}$ is sufficiently larger than $n_{M2}$. It should be noted that the reset current ir can be taken from any other source, and that if such source has high voltage enough to completely reset the saturable reactor 105, the first and second windings 152, 153 may have an equal number of turns.

In addition to the above features, the DC-DC converter according to the present invention is very advantageous in that it suffers only from a greatly reduced level of noise generation. In view of the purpose of stabilizing a DC output voltage, a low level of noises is highly desired. Of noises which may be generated by DC-DC converters or switching regulators, a low-frequency radiation noise, a high-frequency radiation noise and a noise expressed by "noise terminal voltage" are important. The low-frequency radiation noises affect radio sets, etc., and the high-frequency radiation noises affect computers, TV sets, etc. The noise terminal voltage is a measure of how large noises are returned from the switching regulator to an input line through input terminals. Noises returned to an input line may go into another equipment through other outlets, causing operational errors in another equipment.

Figure 11:
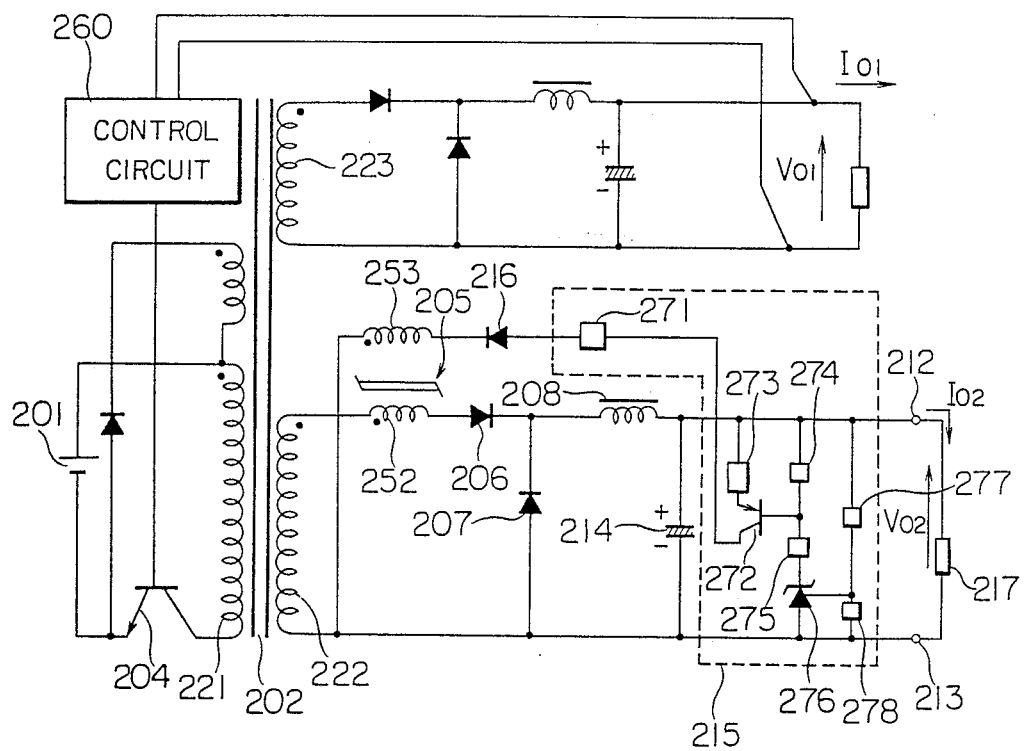
FIG. 11 is a schematic view showing a DC-DC converter according to another embodiment of the present invention.

FIG. 11 shows another embodiment of the present invention directed to a multiple-output DC-DC converter. It is to be noted that this DC-DC converter contains a first circuit for providing a first output $V_{O1}$ and a second circuit for providing a second output $V_{O2}$, and that the second circuit is essentially the same as that of FIG. 9. A reset control circuit 215 contains resistors 271, 273, 274, 275, 277 and 278, a transistor 272 and a shunt regulator 276 which is composed of a variable Zener diode, cathode-anode voltage of which is variable depending on a reference voltage level. Voltage divided by the resistors 277 and 278 is applied to a reference terminal of the shunt regulator 276. Reference terminal voltage varies depending on the output voltage $V_{O2}$, leading to the variation of the cathode-anode voltage, which in turn changes bias voltage applied to a base of the transistor 272. Through this mechanism, the reset current ir can be controlled to stabilize the output voltage. Incidentally, in the first circuit, output voltage $V_{O1}$ is sent to a control circuit 260 which controls a switching transistor 204 connected to a primary winding 221 of a transformer 202.

Figure 12:
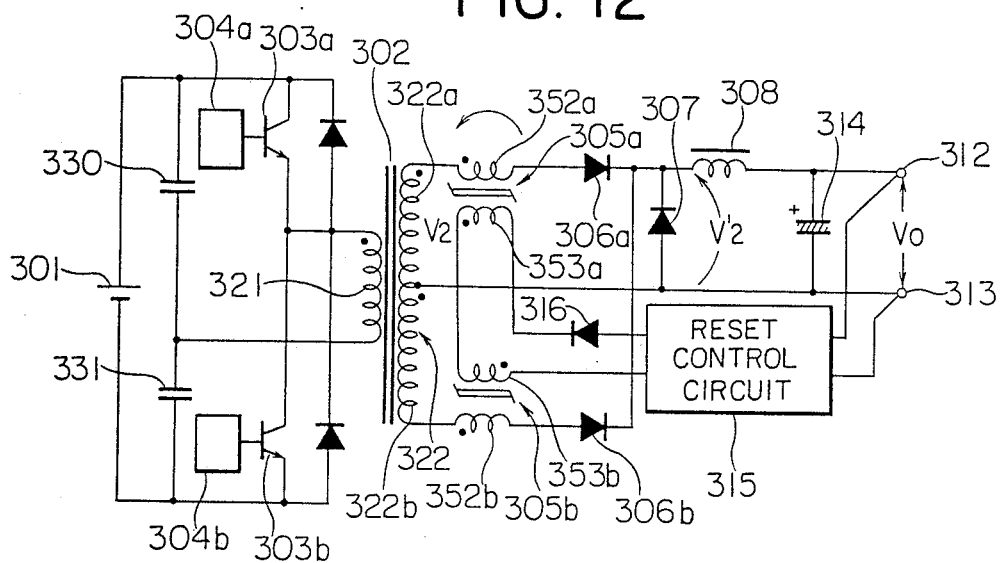
FIG. 12 is a schematic view showing a half-bridge DC-DC converter according to a still further embodiment of the present invention.

FIG. 12 shows a still other embodiment of the present invention in which a DC-DC converter contains a pair of switching transistors and a pair of saturable reactors. This half bridge-type DC-DC converter has a DC power supply 301 whose voltage is equally divided by capacitors 330 and 331. A pair of switching transistors 303a, 303b each connected to oscillators 304a, 304b are connected in series between positive and negative ends of a DC power source 301. A primary winding 321 of a transformer 302 is connected between a point between the two switching transistors and a point between the two capacitors 330, 331. A secondary winding has a center tap which is connected to a negative output terminal 313. An upper half of the secondary winding 332a is connected at its positive end to a first winding 352a of a first saturable reactor 305a. A lower half of the secondary winding 332b is also connected at its positive end to a first winding 352b of a second saturable reactor 305b. The first windings 352a, 352b are connected to a choke coil 308 via diodes 306a, 306b, respectively. A capacitor 314 is connected between positive and negative output terminals 312, 313. Second windings 353a, 353b and a diode 316 are connected in series to a reset control circuit 315 which provides reset current ir in response to output voltage $V_0$.

The oscillators 304a, 304b supply current for turning on the transistors 303a, 303b alternatingly with some intervals. When the transistor 304a is turned on, voltage flows through a primary winding 321 with its positive polarity on the dotted side, inducing in a secondary winding 322 voltage whose positive polarity is on the dotted side. Because of the polarity of the diode 306b, the induced current flows through the saturable reactor 305a, the diode 306a and the choke coil 308. Thus, voltage $V_0$ appears at the capacitor 314 with its positive polarity on the side of the positive output terminal 312. On the other hand, when the transistor 303b is turned on, current of the opposite direction flows from the lower half of the secondary winding 322b through the saturable reactor 305b, the diode 306b and the choke coil 308. Thus, voltage $V_0$ of the same polarity appear between the output terminals 312,313.

Figure 13:
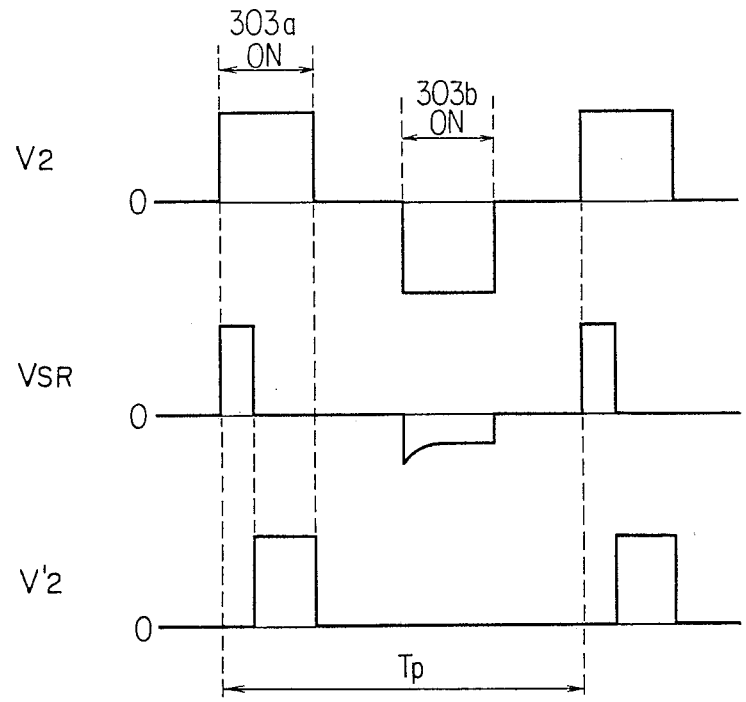
FIG. 13 is a time chart of voltage in the DC-DC converter of FIG. 12.

Second windings 353a, 353b are connected in series in such a manner that the second winding 353a and the first winding 352a have the same polarity, while the second winding 353b and the first winding 352b have a different polarity. Thus, the two saturable reactors 305a, 305b work in the same manner. Further, in each of the saturable reactors 305a, 305b, the first and second windings 352a—353a, 352b—353b are magnetically coupled so that unnecessary voltage due to the resonance current is not substantially applied to it. A time chart of voltages $V_2$, $V_{SR}$ and $V_2'$ is shown in FIG. 13.

Figure 14:
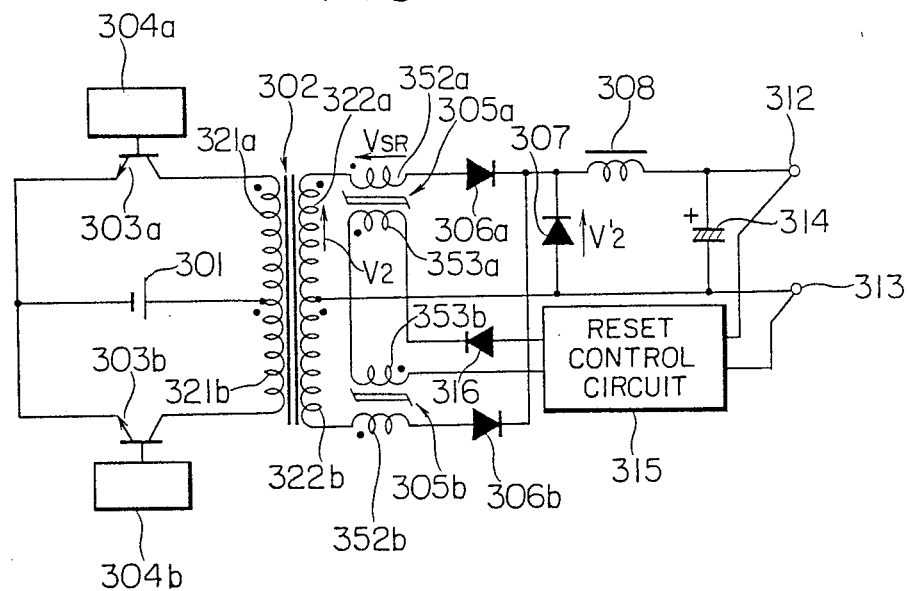
FIG. 14 is a schematic view showing a push-pull DC-DC converter according to a still further embodiment of the present invention.

FIG. 14 shows a still further embodiment of the present invention which is a push-pull DC-DC converter. It is to be noted that a circuit on the secondary winding side is completely the same as that of FIG. 12. A primary winding has a positive end connected to a collector of a switching transistor 303a and a negative end connected to a collector of a switching transistor 303b. Both emitters of the transistors 303a, 303b are connected to each other, and a DC power source 301 is connected between a center tap of the primary winding and a point between the transistors 303a, 303b. This push-pull DC-DC converter works essentially in the same manner without causing any extraordinary temperature rise of the saturable reactors.

Figure 15:
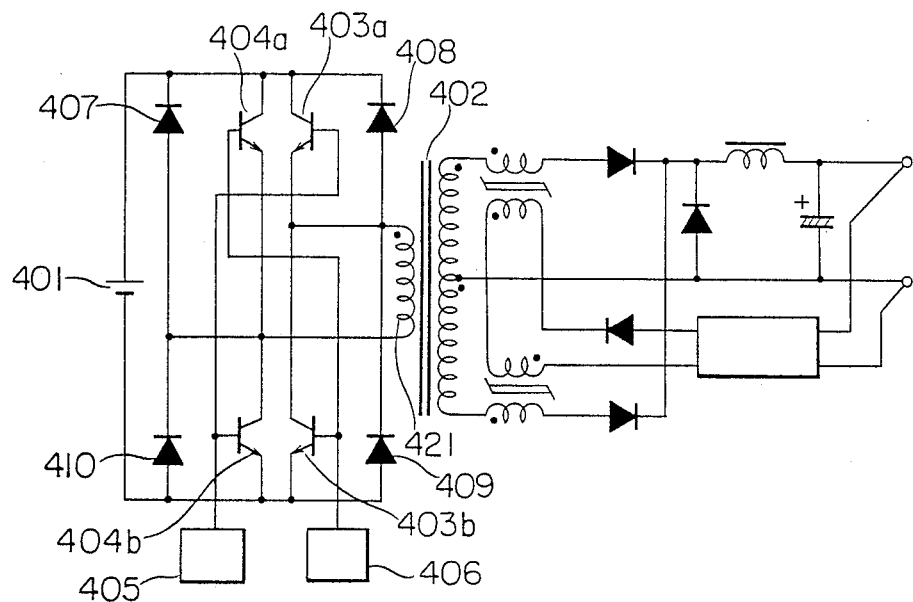
FIG. 15 is a schematic view showing a full-bridge DC-DC converter according to a still further embodiment of the present invention.

FIG. 15 shows a still further embodiment of the present invention which is a full-bridge DC-DC converter. Again, a portion of the circuit on the side of a secondary winding is completely the same as that of FIG. 12. Therefore, reference numerals are omitted. When transistors 403a, 404b are turned on by an oscillator 405, current flows from a DC power source 401, through the transistor 403a, a primary winding 421 and the transistor 404b, back to the source 401. On the other hand, when transistors 404a, 403b are turned on by an oscillator 406, current flows from the DC power source, through the transistor 404a, the primary winding 421 and the transistor 403b, back to the source 401. Thus, current flows back and forth through the primary winding 421, enabling this full-bridge DC-DC converter to work in the same manner as the half-bridge DC-DC converter.

Figure 16:
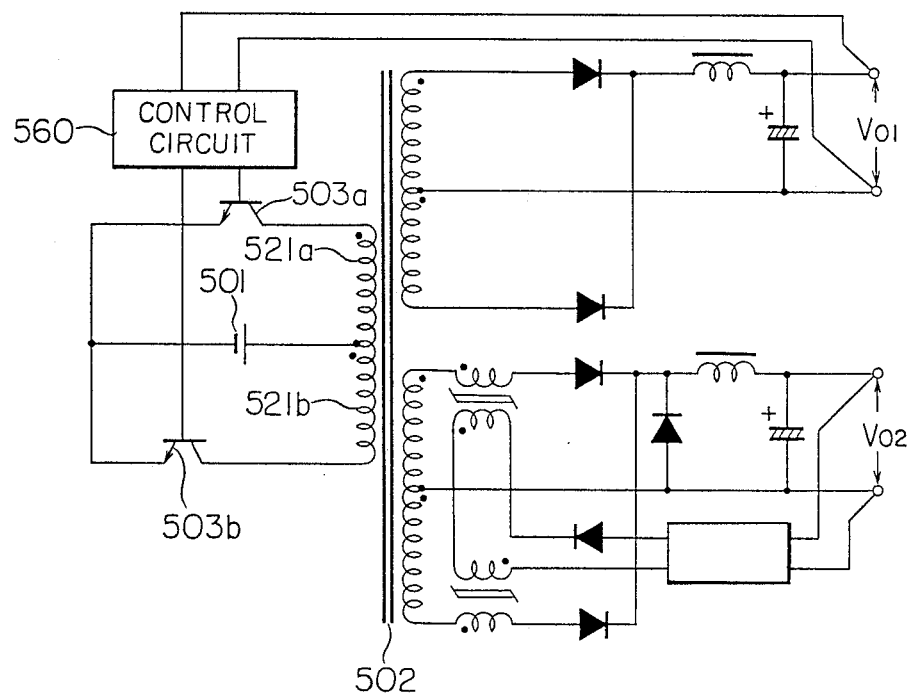
FIG. 16 is a schematic view showing a multiple-output DC-DC converter according to a still further embodiment of the present invention.

FIG. 16 shows a still further embodiment of the present invention which is a multiple-output DC-DC converter. Two output circuits are the same as that of FIG. 12, except that an upper part of the output circuit does not contain saturable reactors. Thus, no reference numerals are assigned thereto. Output voltage $V_{01}$ of the upper part of the circuit is sent to a control circuit 560 which controls the widths of pulses supplied to bases of switching transistors 503a, 503b, so that stable output may be provided. As for a lower part of the output circuit, the extraordinary temperature rise of two saturable reactors can be avoided as in FIG. 12.

Figure 17:
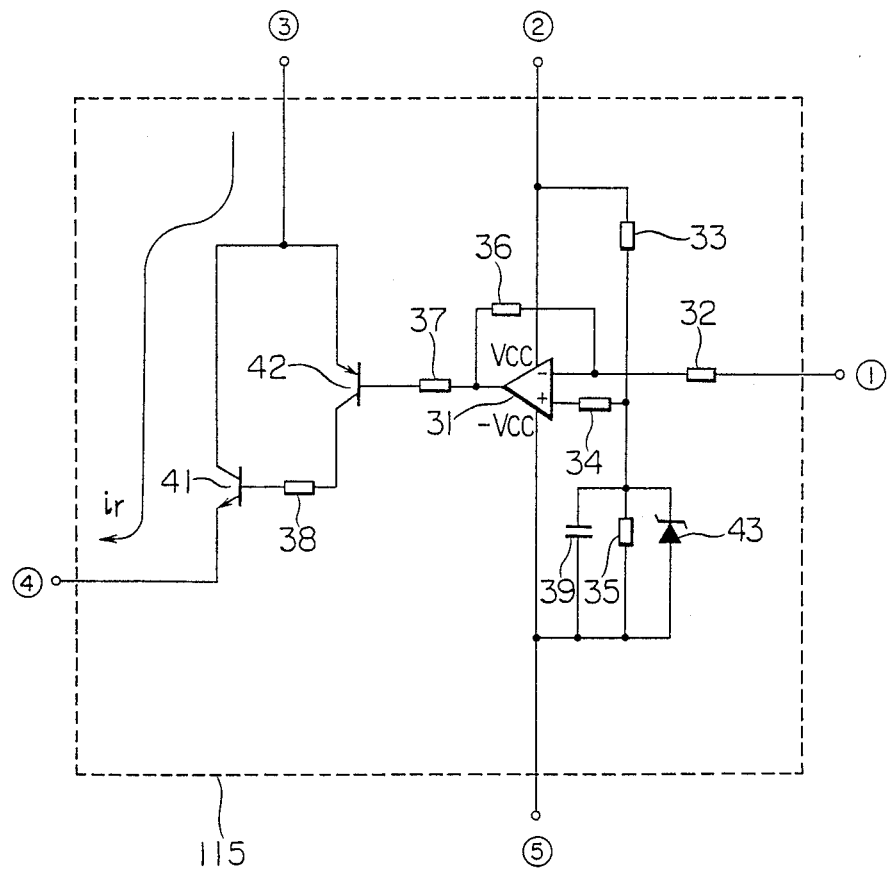
FIG. 17 is a schematic view showing a detailed circuit of the reset control circuit contained in the DC-DC converter of FIG. 9.

FIG. 17 shows a specific circuit of the reset control circuit 115 suitable for the present invention. Terminals ①, ② and ③ are connected to the positive terminal 112, a terminal ④ is to the diode 116, and a terminal ⑤ is to the negative terminal 113.

$V_{cc}$ of a linear amplifier 31 is connected to a terminal ② and $-V_{cc}$ is connected to a terminal ⑤. A terminal ① is connected to an inverting input of the linear amplifier 31 through a resistor 32. One end of a resistor 33 is connected to $V_{cc}$ and the other end thereof is connected to a non-inverting input of the linear amplifier 31 through a resistor 34. A resistor 35, a capacitor 39 and a cathode of a Zener diode 43 are connected to the resistors 33 and 34. The other ends of the resistor 35 and capacitor 39 and an anode of the Zener diode 43 are connected to $-V_{cc}$. A resistor 36 is connected between the inverting input of the linear amplifier 31 and an output thereof. The output of the linear amplifier is further connected to a base of a transistor 42 through a resistor 37. An emitter of the transistor 42 is connected to a terminal ③ and a collector thereof is connected to a base of a transistor 41 through a resistor 38. A collector of the transistor 41 is connected to the terminal ③ and an emitter thereof is connected to a terminal ④ through a diode 40.

In operation, a reference voltage which is generated by a reference voltage generator constituted by the resistors 33 and 35, capacitor 39 and Zener diode 43 is compared with a detection signal $v_s$ indicative of the output voltage $V_0$, so that output determined by their difference is generated from the linear amplifier 31. The transistors 41 and 42 control the current flowing from the terminal ③ to the terminal ④ on the basis of the output of the linear amplifier 31. The terminals ② and ③ are connected to a power source necessary for operating the reset control circuit 115.

The reset current $i_r$ flowing through the second winding 153 of the saturable reactor 16 is controlled in accordance with the difference between the reference voltage and the detection voltage $v_s$, thereby regulating the output voltage $V_0$. The reset current $i_r$ flows along the path indicated by the broken line in FIG. 9.

The present invention will be explained in further detail by the following Examples.

EXAMPLE 1

Low-frequency radiation noises, high-frequency radiation noises and noise terminal voltage were measured on the DC-DC converters of FIGS. 9 and 6. Measurement conditions were according to VDE 0875 class B. The results were shown in FIGS. 18–20. In each figure, the term "Present Invention" means the DC-DC converter of FIG. 9, and the term "Prior Art" means that of FIG. 6. The low-frequency and high-frequency radiation noises were measured at a 10-m distance.

Figure 18:
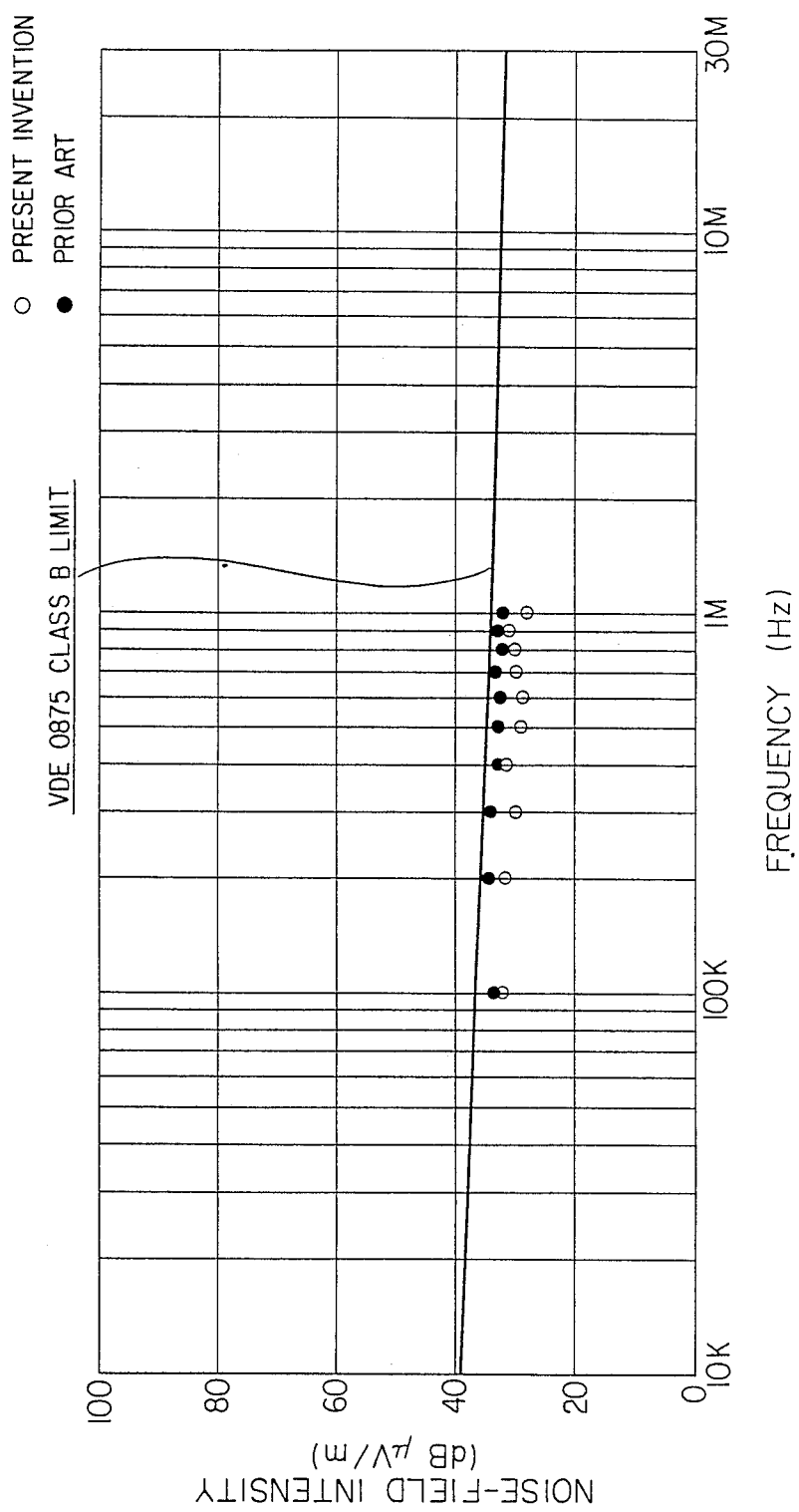
FIG. 18 is a graph showing low-frequency radiation noises measured on the DC-DC converters of FIGS. 9 and 6, respectively.
Figure 19:
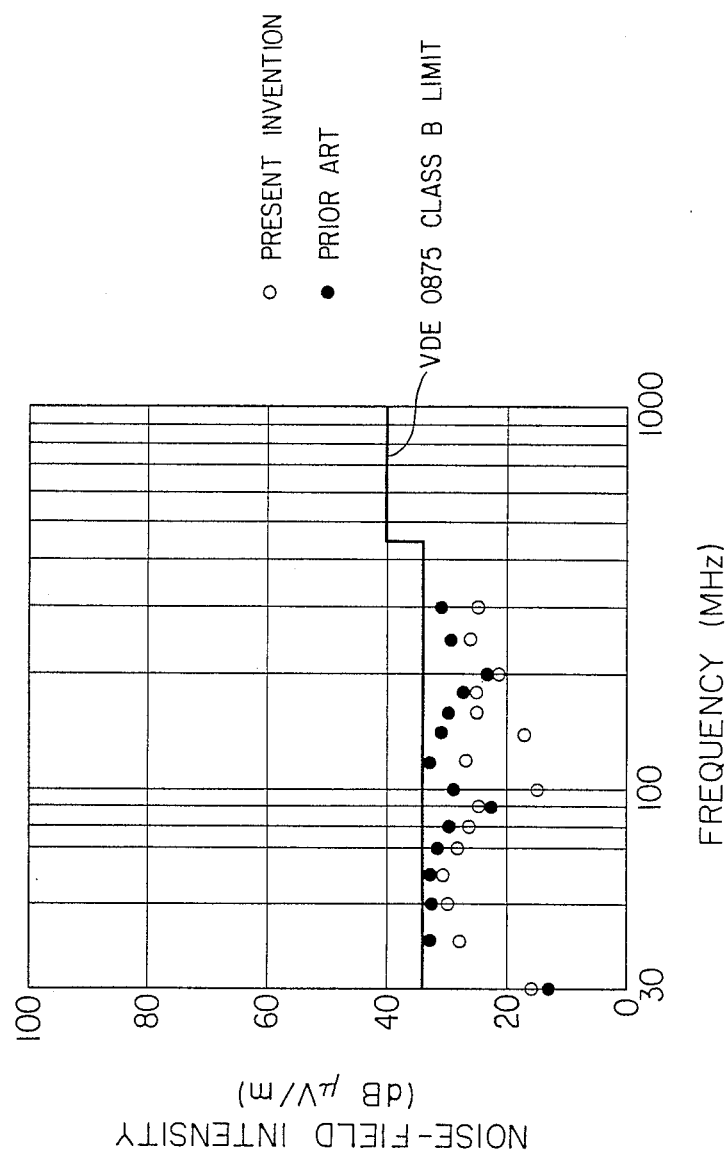
FIG. 19 is a graph showing high-frequency radiation noises measured on the DC-DC converters of FIGS. 9 and 6, respectively.
Figure 20:
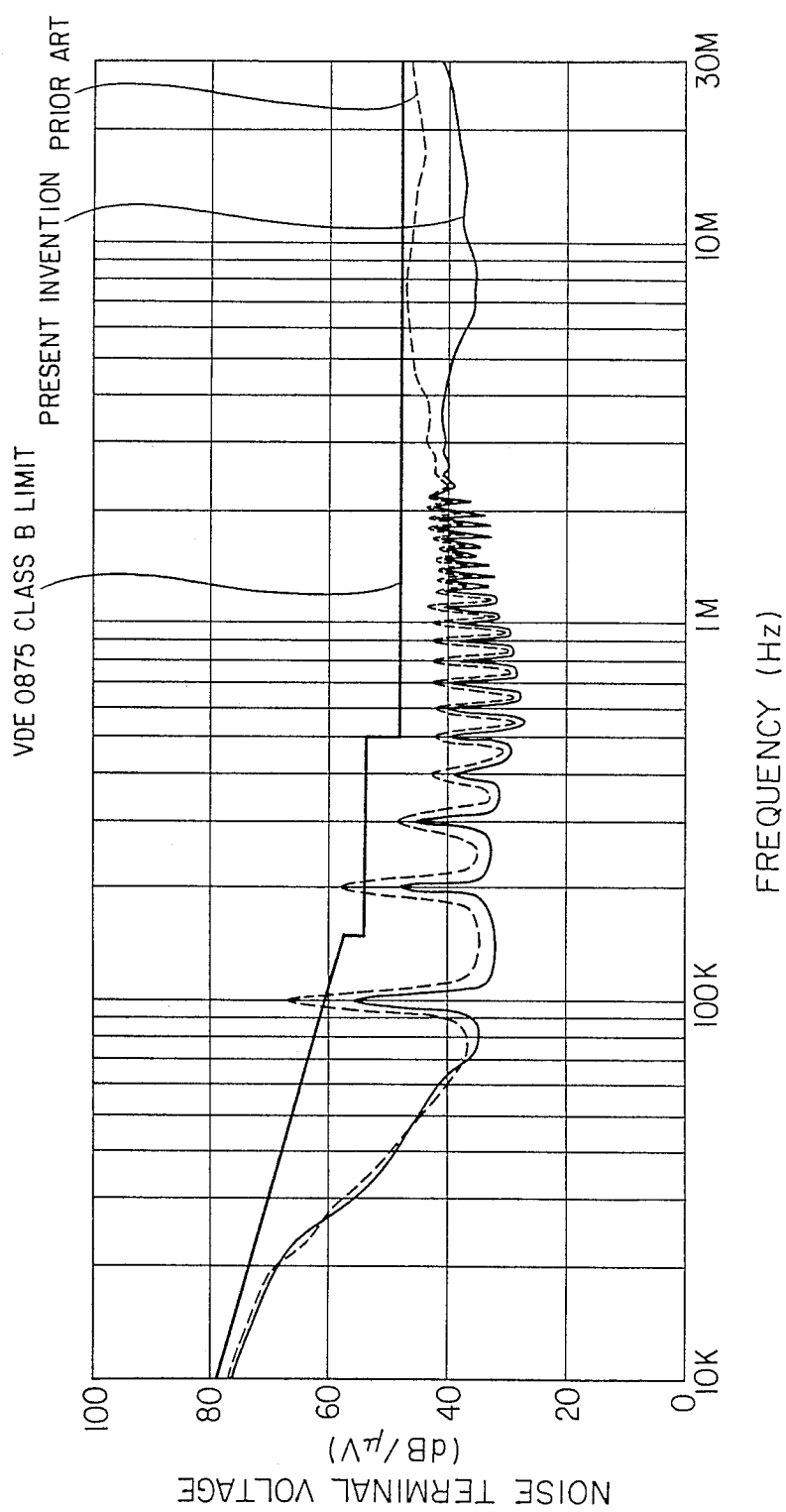
FIG. 20 is a graph showing noise terminal voltage measured on the DC-DC converters of FIGS. 9 and 6, respectively.

FIGS. 18–20 clearly show that the DC-DC converter of the present invention is much superior to the prior art DC-DC converter of FIG. 6 in respect of low noise generation. Since the DC-DC converter of the present invention does not substantially suffer from the ratcheting of a transformer and extraordinary temperature rise of a saturable reactor, it is highly suitable for any applications requiring stable DC voltage.

EXAMPLE 2

Figure 1:
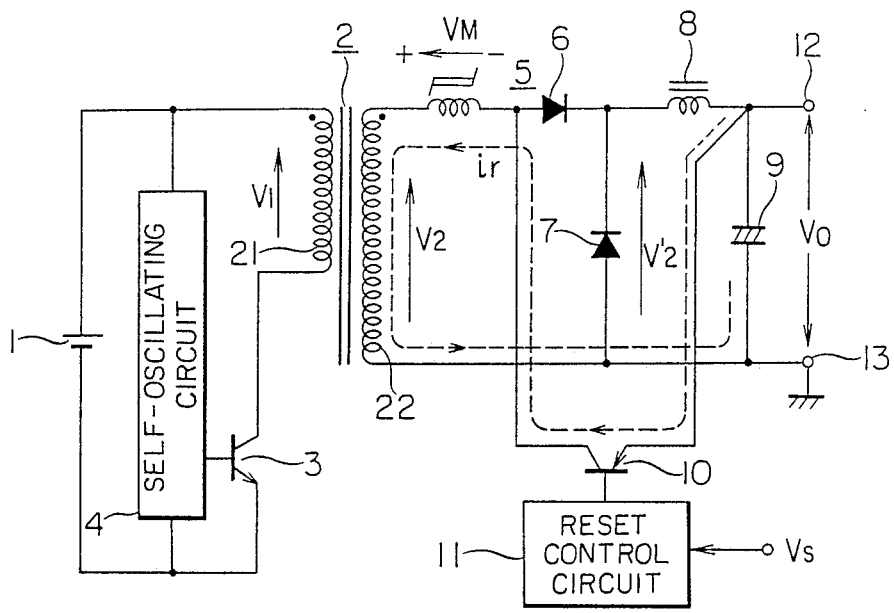
FIG. 1 is a schematic view showing a circuit of a conventional DC-DC converter.

Temperature rise of saturable reactors was measured on the DC-DC converters of FIGS. 11 and 1. Measurement conditions were as follows:

| Saturable Reactor Core | Effective Sectional Area: 5.6 mm$^2$ Mean Magnetic Path Length: 36.1 mm Material: Shown in Table 1 |
|---|---|
| Input | DC 130 V Frequency 100 kHz |
| Output | $V_{01} = 5$ V $\quad I_{01} = 10$A $V_{02} = 10$ V $\quad I_{02} = 4$A |

The results are shown in Table 1 below.

TABLE 1

| Material of Saturable Reactor Core | Temperature Rise (°C.) | |
|---|---|---|
| | Present (1) Invention | Ramey (2) |
| 50% Permalloy | 58 | 63 |
| 80% Ni Permalloy | 50 | 55 |
| Amorphous $Fe_4Co_{69}Cr_2Si_{15}B_{10}$ | 39 | 59 |
| Amorphous $Fe_4Co_{66}Si_{17}B_{13}$ | 36 | 68 |
| Amorphous $Fe_5Co_{70}Si_{15}B_{10}$ | 44 | 57 |
| Amorphous $Fe_{0.4}Co_{70.1}Mn_{5.5}Si_{15}B_9$ | 38 | 59 |
| Amorphous $Fe_{4.5}Co_{67}Ni_{1.5}Nb_2Si_{10}B_{15}$ | 41 | 60 |
| Amorphous $Fe_6Co_{67}Mo_2Si_{15}B_{10}$ | 37 | 63 |
| Amorphous $Fe_{54}Ni_{23}Mo_1Si_{10}B_9$ | 49 | 62 |
| Amorphous $Fe_{0.4}Co_{69.3}Mn_6Nb_{0.3}Si_{15}B_9$ | 42 | 57 |

Note:
(1) DC-DC converter of FIG. 11
(2) DC-DC converter of FIG. 1

EXAMPLE 3

The same measurements were carried out on the DC-DC converter of FIG. 12 and a Ramey-type DC-DC converter having a pair of switching transistors for a primary winding of a transformer and a pair of saturable reactors.

| Saturable Reactor Core | Effective Sectional Area: 5.6 mm$^2$ Mean Magnetic Path Length: 36.1 mm Material: Shown in Table 2 |
|---|---|
| Input | DC 130 V Frequency 50 kHz |
| Output | 12 V 0–4A |

The results are shown in Table 2 below.

TABLE 2

| Material of Saturable Reactor Core | Temperature Rise (°C.) | |
|---|---|---|
| | Present (1) Invention | Ramey |
| 50% Ni Permalloy | 48 | 52 |
| Amorphous $Fe_{54}Ni_{23}Mo_1Si_{10}B_{12}$ | 38 | 48 |
| Amorphous $Fe_5Co_{70}Si_{15}B_{10}$ | 31 | 43 |
| Amorphous $Fe_4Co_{69}Cr_2Si_{15}B_{10}$ | 27 | 43 |
| Amorphous $Fe_{0.4}Co_{70.1}Mn_{5.5}Si_{15}B_9$ | 23 | 41 |
| Amorphous $Fe_{0.4}Co_{69.3}Mn_6Nb_{0.3}Si_{15}B_9$ | 23 | 42 |

Note (1): DC-DC converter of FIG. 12

What is claimed is:

1. A DC power supply comprising:
    a main transformer having a primary winding and a secondary winding, wherein said primary winding is capable of inducing an induced voltage in said secondary winding, said voltage having alternating voltage pulses of opposite polarity spaced from one another by a predetermined time duration of zero voltage;
    supply means for supplying a DC input voltage to said primary winding, wherein said supply means is connected to a first end of said primary winding by a first switching element and to a second end of said primary winding by a second switching element, each of said switching elements having an ON and OFF condition, said switching elements being alternatively operable to the ON condition;
    a first saturable reactor, containing a magnetic core of amorphous metal and a second saturable reactor containing a magnetic core of amorphous metal responsive to said induced voltage to provide an intermediate voltage, wherein said first and second saturable reactors each include an output winding and a control winding, a first end of said output winding of said first saturable reactor and a first end of said output winding of said second saturable reactor being respectively connected to a first end and a second end of said secondary winding, and wherein a second end of each of said output windings of said first and second saturable reactors is connected through first and second diodes, respectively, to form a node at which said intermediate voltage appears;
    filtering means, connected to said node and having a first output terminal and a second output terminal, for filtering said intermediate voltage to provide an output voltage across said first and second filter output terminals, wherein said second filter output terminal is connected to said secondary winding of said main transformer by at least one intermediary tap; and
    reset control circuit means for resetting said first and second saturable reactors in response to said output voltage, wherein said reset control circuit means includes first and second reset input terminals connected to said first and second filter output terminals, respectively, and said reset control circuit means further includes first and second reset output terminals, and wherein a first end of said control winding of said first saturable reactor is connected to said reset output terminal, and a second end of said control winding of said first saturable reactor is connected to a first end of said control winding of said second saturable reactor, and a second end of said control winding of said second saturable reactor is connected to said second reset output terminal which is maintained at a substantially ground level voltage potential, said control windings of said first and second saturable reactors being connected in series between said first reset output terminal and a substantially ground level voltage potential to reduce saturable reactor temperature rise and to reduce generated electronic noise.

2. The DC Power Supply of claim 1 wherein a third diode is interposed between first reset output terminal and said control windings of said first and second saturable reactors connected in series.

3. The DC power supply of claim 2 wherein said transformer includes a preselected turn ratio between said primary and secondary coils by which said reset control means is made operative to reset said first and second saturable reactors in response to said output voltage.

* * * * *